United States Patent
Moser et al.

(10) Patent No.: US 10,007,708 B2
(45) Date of Patent: Jun. 26, 2018

(54) SYSTEM AND METHOD OF PROVIDING VISUALIZATION SUGGESTIONS

(71) Applicants: Flavia Moser, Vancouver (CA); Scott Cameron, North Vancouver (CA); Julian Gosper, Vancouver (CA)

(72) Inventors: Flavia Moser, Vancouver (CA); Scott Cameron, North Vancouver (CA); Julian Gosper, Vancouver (CA)

(73) Assignee: Business Objects Software Ltd., Dublin (IE)

(*) Notice: Subject to any disclaimer, the term of this patent is extended or adjusted under 35 U.S.C. 154(b) by 364 days.

(21) Appl. No.: 14/529,779

(22) Filed: Oct. 31, 2014

(65) Prior Publication Data
US 2016/0124960 A1    May 5, 2016

(51) Int. Cl.
G06F 17/30        (2006.01)
G06T 11/20        (2006.01)

(52) U.S. Cl.
CPC ...... G06F 17/30554 (2013.01); G06T 11/206 (2013.01)

(58) Field of Classification Search
CPC . G06T 11/206; G06F 17/246; G06F 17/30554
See application file for complete search history.

(56) References Cited

U.S. PATENT DOCUMENTS

| | | | | |
|---|---|---|---|---|
| 2006/0221077 A1* | 10/2006 | Wright | ............. | G06F 17/30554 |
| | | | | 345/428 |
| 2009/0297064 A1* | 12/2009 | Koziol | ................. | G06T 11/203 |
| | | | | 382/302 |
| 2011/0137850 A1* | 6/2011 | Mourey | ................. | G06Q 10/00 |
| | | | | 706/54 |

(Continued)

OTHER PUBLICATIONS

Tatu, Andrada, et al. "Combining automated analysis and visualization techniques for effective exploration of high-dimensional data." Visual Analytics Science and Technology, 2009. VAST 2009. IEEE Symposium on. IEEE, 2009.*

(Continued)

*Primary Examiner* — Usmaan Saeed
*Assistant Examiner* — William P Bartlett
(74) *Attorney, Agent, or Firm* — Schwegman Lundberg & Woessner, P.A.

(57) ABSTRACT

Techniques of providing visualization suggestions are disclosed. In some example embodiments, a current visualization of at least a portion of data of a dataset is determined to be displayed to a user in a graphical user interface of a device, a plurality of visualization candidates is generated based on an application of transition rules to the current visualization, a corresponding score for each one of the plurality of visualization candidates is generated based on a corresponding level of data variance for the data of the corresponding visualization candidate, a ranking of the plurality of visualization candidates is generated based on the scores, at least one of the plurality of visualization candidates is selected based on the ranking, and a plurality of selectable visualization suggestions corresponding to the selected visualization candidates is caused to be displayed to the user in the graphical user interface of the device.

18 Claims, 10 Drawing Sheets

(56) References Cited

U.S. PATENT DOCUMENTS

| | | | |
|---|---|---|---|
| 2013/0097177 A1* | 4/2013 | Fan | G06F 17/30554 707/748 |
| 2014/0198105 A1* | 7/2014 | Gibson | G06T 11/206 345/440 |
| 2015/0278214 A1* | 10/2015 | Anand | G06F 17/30696 707/748 |

OTHER PUBLICATIONS

Leban, Gregor, et al. "Vizrank: Data visualization guided by machine learning." Data Mining and Knowledge Discovery 13.2 (2006): 119-136.*

Vartak, Manasi, et al. "SeeDB: supporting visual analytics with data-driven recommendations." VLDB, 2015.*

Mutlu, Belgin, Eduardo Veas, and Christoph Trattner. "Vizrec: Recommending personalized visualizations." ACM Transactions on Interactive Intelligent Systems (TiiS) 6.4 (2016): 31.*

* cited by examiner

| FROM/TO | Bar | Group Bar $|DP| < \alpha$ | Stacked Bar $|DP| \geq \alpha$ | Dual Bar | Scatter | Pie | Time | Stacked Time | Dual Time | Geo |
|---|---|---|---|---|---|---|---|---|---|---|
| Bar | | DC, DP | DO | M | | | T | | | |
| Group Bar | | | DO | | | 1 | | | | |
| Stacked Bar | | | | M | | 1 | | T | | |
| Dual Bar | 1, 1 | | | | 1 | | | | | |
| Scatter | 1, 1 | | DO | | | | | D | M | |
| Pie | 1 | DP | | | | | | T | | |
| Time | 1 | | | | | 1 | | D | | |
| Stacked Time | | | DO | | | | | | M | |
| Dual Time | | | | $|D| < \beta$ | $|D| \geq \beta$ | | | D × 2 | | |
| Geo | 1 | | | | | 1 | | | | |

*FIG. 5*

SYSTEM AND METHOD OF PROVIDING VISUALIZATION SUGGESTIONS

TECHNICAL FIELD

The present application relates generally to the technical field of data processing, and, in various embodiments, to systems and methods of providing visualization suggestions.

BACKGROUND

In conventional data analysis tools, it can be difficult for analysts and business users to know what the best next step to take is when navigating or exploring data. This feeling of being lost in the data results in a less powerful analysis experience, as well as a higher degree of frustration and, potentially, wasted time.

BRIEF DESCRIPTION OF THE DRAWINGS

Some example embodiments of the present disclosure are illustrated by way of example and not limitation in the figures of the accompanying drawings, in which like reference numbers indicate similar elements, and in which:

FIG. 5 illustrates a matrix of transition rules, in accordance with some example embodiments;

DETAILED DESCRIPTION

Figure 1:
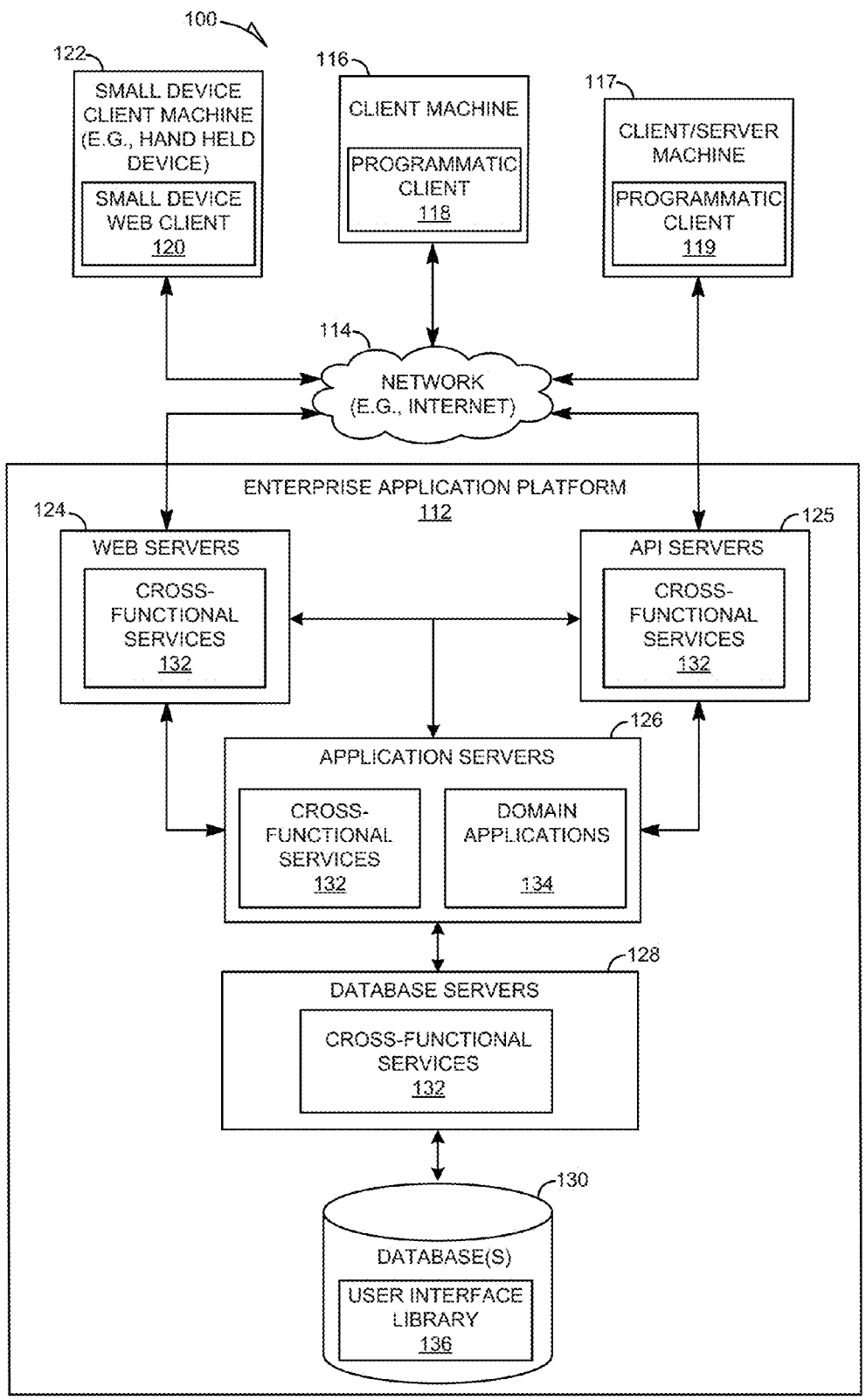
FIG. 1 is a network diagram illustrating a client-server system, in accordance with some example embodiments.

Example methods and systems of providing visualization suggestions are disclosed. In the following description, for purposes of explanation, numerous specific details are set forth in order to provide a thorough understanding of example embodiments. It will be evident, however, to one skilled in the art that the present embodiments can be practiced without these specific details.

The present disclosure provides features that assist users by suggesting possible next exploration steps in the form of automatically generated visualizations of data, such as charts, that are both contextually relevant and statistically interesting. These features provide a new mode of interaction with data that makes the exploration experience more intuitive and powerful. A unique level of assistance is provided to users who are performing the very complex task of data exploration. Instead of simply giving the users a set of tools and leaving it to them to manually discover interesting exploration paths via trial and error, the system of the present disclosure offers possible next steps that are contextually related to the users' current view.

In some example embodiments, a current visualization of at least a portion of data of a dataset to be displayed to a user in a graphical user interface of a device can be determined. The dataset can comprise a plurality of measures and a plurality of dimensions. The current visualization can comprise a graphical representation of the at least a portion of data. The at least a portion of data can comprise at least one of the plurality of measures and at least one of the plurality of dimensions. A plurality of visualization candidates can be generated based on an application of transition rules to the current visualization. Each one of the plurality of visualization candidates can comprise a different graphical representation of data of the dataset. A corresponding score for each one of the plurality of visualization candidates can be generated based on a corresponding level of data variance for the data of the corresponding visualization candidate. A ranking of the plurality of visualization candidates can be generated based on the scores. At least one of the plurality of visualization candidates can be selected based on the ranking. A plurality of selectable visualization suggestions corresponding to the selected visualization candidates can be caused to be displayed to the user in the graphical user interface of the device.

In some example embodiments, the plurality of selectable visualization suggestions can be caused to be displayed concurrently with the current visualization. The current visualization can be caused to be displayed in a first dedicated section of the user interface for current visualizations, and the plurality of selectable visualization suggestions can be caused to be displayed in a second dedicated section of the user interface for visualization suggestions. In some example embodiments, a user selection of one of the plurality of selectable visualization suggestions can be detected, and the graphical representation corresponding to the selected one of the selectable visualization suggestions can be caused to be displayed in the first dedicated section of the user interface for current visualizations.

In some example embodiments, each one of the plurality of visualization suggestions can comprise a corresponding preview of the corresponding graphical representation. In some example embodiments, the plurality of measures can comprise numeric values. In some example embodiments, the current visualization can comprise a chart.

In some example embodiments, at least one filter selected by the user to generate the current visualization can be determined, and the at least one filter can be applied in generating the plurality of visualization candidates.

In some example embodiments, the generated scores for the plurality of visualization candidates can be further based on at least one of: a corresponding level of cardinality for the data of the corresponding visualization candidate, usage data of a measure of the corresponding visualization candidate, usage data of a dimension of the corresponding visualization candidate, usage data of a chart type of the corresponding visualization candidate, profile information of the user, and explicit user feedback for a measure, dimension, or chart type of the corresponding visualization candidate.

In some example embodiments, the selecting of the at least one of the plurality of visualization candidates can be further based on the selected visualization candidates having varying chart types.

The methods or embodiments disclosed herein may be implemented as a computer system having one or more modules (e.g., hardware modules or software modules). Such modules may be executed by one or more processors of the computer system. One or more of the modules can be combined into a single module. In some example embodiments, a non-transitory machine-readable storage device can store a set of instructions that, when executed by at least one processor, causes the at least one processor to perform the operations and method steps discussed within the present disclosure.

FIG. 1 is a network diagram illustrating a client-server system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117 and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

The enterprise application platform 112 can implement partition level operation with concurrent activities. For example, the enterprise application platform 112 can implement a partition level lock, a schema lock mechanism, manage activity logs for concurrent activity, generate and maintain statistics at the partition level, and efficiently build global indexes. The enterprise application platform 112 is described in greater detail below in conjunction with FIG. 2.

Figure 2:
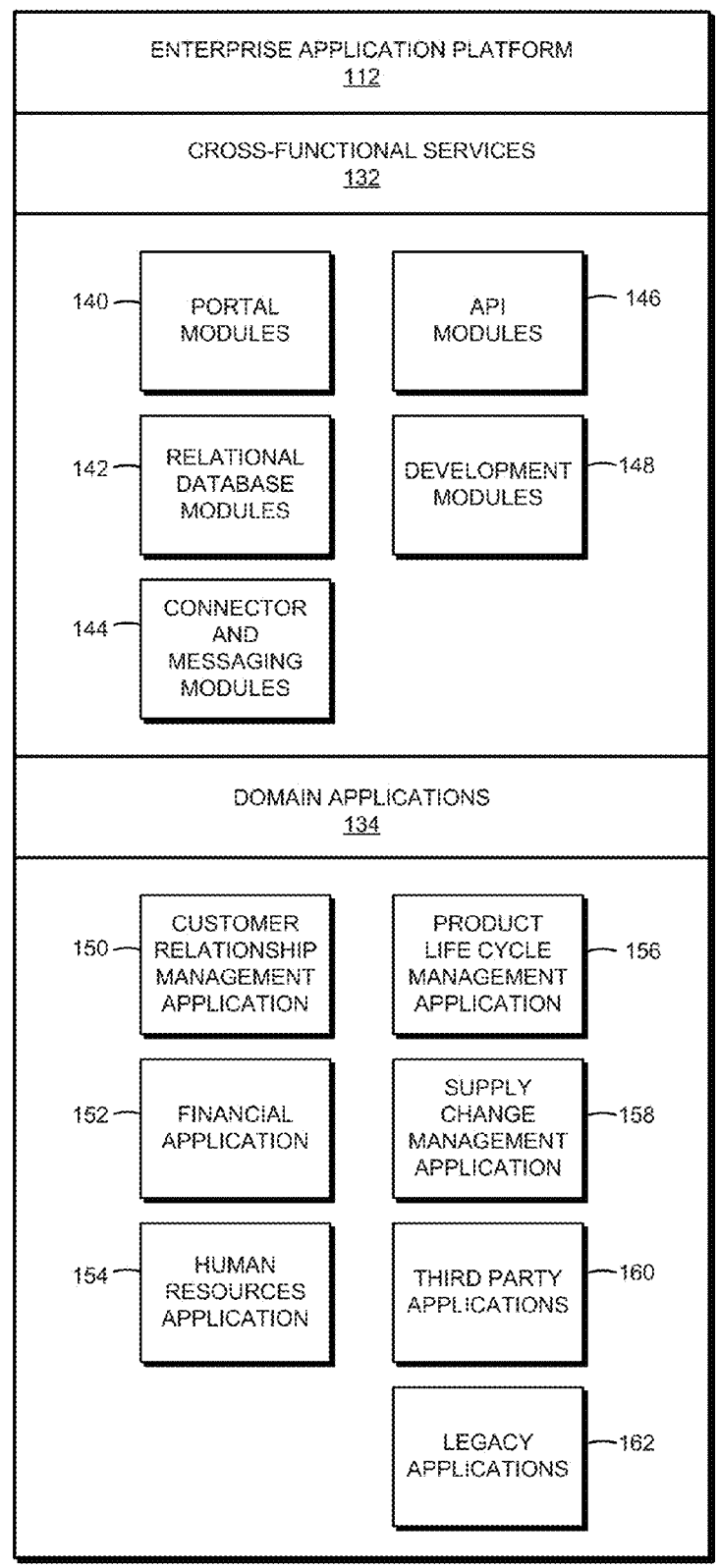
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services and exchange information with other users and within a defined scope. For example, the role can determine the content that is available to the user and the activities that the user can perform. The portal modules 140 include a generation module, a communication module, a receiving module and a regenerating module. In addition the portal modules 140 can comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 can provide support services for access to the database(s) 130, which includes a user interface library 136. The relational database modules 142 can provide support for object relational mapping, database independence and distributed computing. The relational database modules 142 can be utilized to add, delete, update and manage database elements. In addition, the relational database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real time information.

The product life cycle management applications 156 can enable the management of a product throughout the life cycle of the product. For example, the product life cycle management applications 156 can enable collaborative engineering, custom product development, project management, asset management and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

In some example embodiments, features of the present disclosure assist users during data exploration by suggesting possible next steps in the form of contextual visualizations. Visualizations can comprise graphical representations of data, such as charts, including measures and dimensions. A measure can be any property or collection of numerical values on which calculations (e.g., sum, count, average, minimum, maximum) can be made. A dimension can be a structure containing a collection of categories or labels.

The currently active visualization (e.g., the visualization that the user has generated and is currently viewing) can be the starting point for the visualization suggestions, with possible next steps including, for example, changing the chart type, splitting by a dimension, swapping out measures or dimensions, and so on. Suggestions can be scored and ranked to maximize the probability that the choices presented are relevant and interesting to the user.

Figure 3:
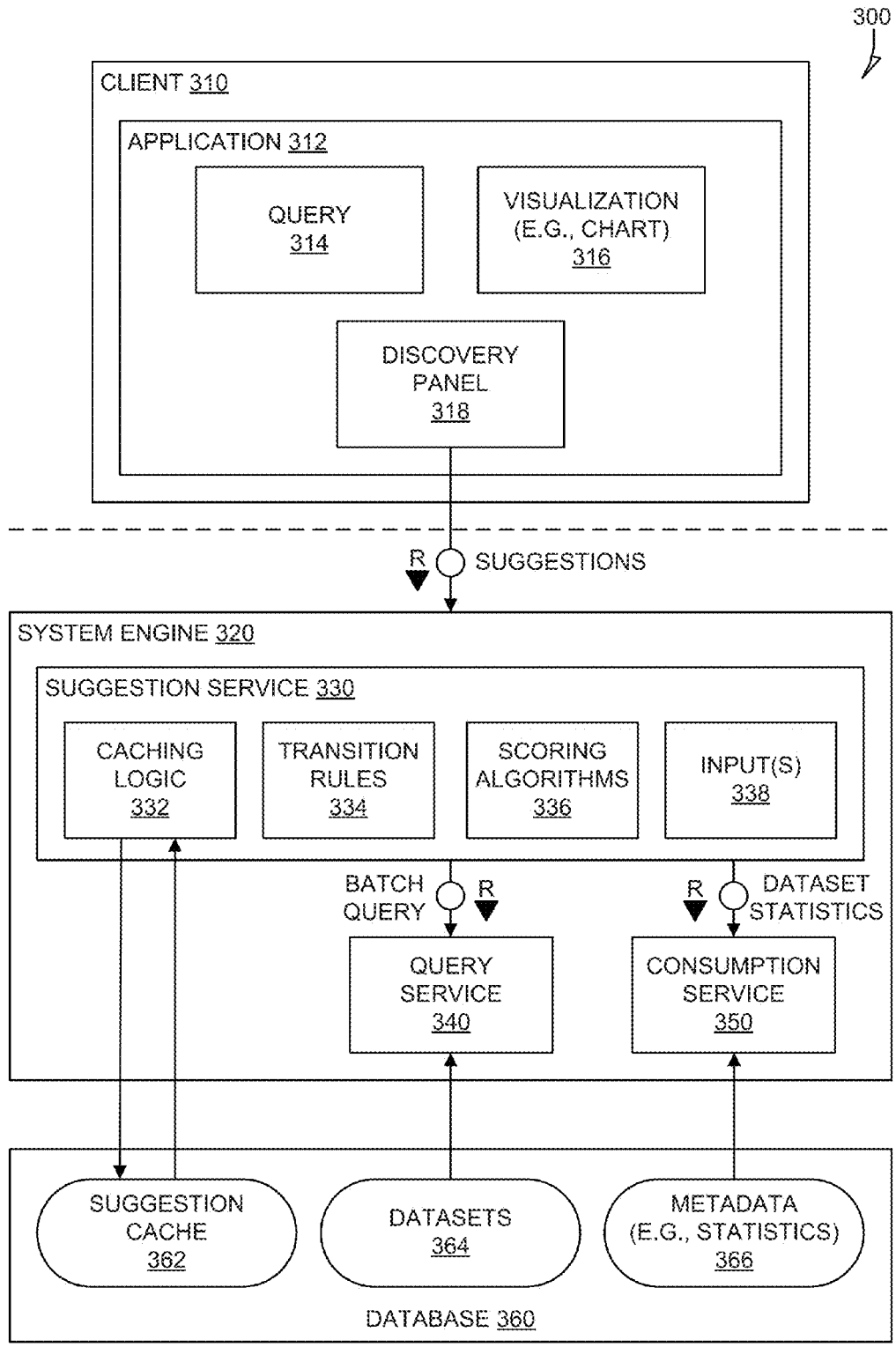
FIG. 3 illustrates a system architecture for providing visualization suggestions, in accordance with some example embodiments.

The visualization suggestions can be presented in a side-panel and can be consumed or ignored as the user wishes. The visualization suggestions can aid the users when they are stuck and do not know where to go next in terms of data exploration (e.g., what operations or manipulations to apply to the current visualization), but can also be presented in a peripheral area of the user interface so that they can be easily ignored by users who already know exactly where they want to go in terms of data exploration FIG. 3 illustrates a system architecture 300 for providing visualization suggestions, in accordance with some example embodiments. The system architecture 300 can comprise three layers: a client 310, a system engine 320, and a database 360. In some example embodiments, the client 310 is incorporated into one of the client machines 116, 117, or 122 in FIG. 1, the system engine 320 is incorporated into application servers 126 in FIG. 1, and the database 360 is incorporated into database(s) 130 in FIG. 1. However, it is contemplated that other configurations are also within the scope of the present disclosure.

A user can use an application 312 on the client 310 to explore data. The user can use the application 312 to generate a query to obtain data via a query component 314 of the application 314. The user can use a visualization component 316 of the application 312 to generate a current visualization of the obtained data, such as a chart. The application 312 can also comprise a discovery panel component 318 to present visualization suggestions to the user concurrently with the current visualization. The discovery panel component 318 can request visualization suggestions from the system engine 320. The system engine 320 can comprise a suggestion service 330 that is configured to generate visualization suggestions and return them to the discovery panel component 318 based on the request. The database 360 can store one or more datasets 364, from which data can be obtained in the generation of the current visualization and visualization suggestions.

Figure 4:
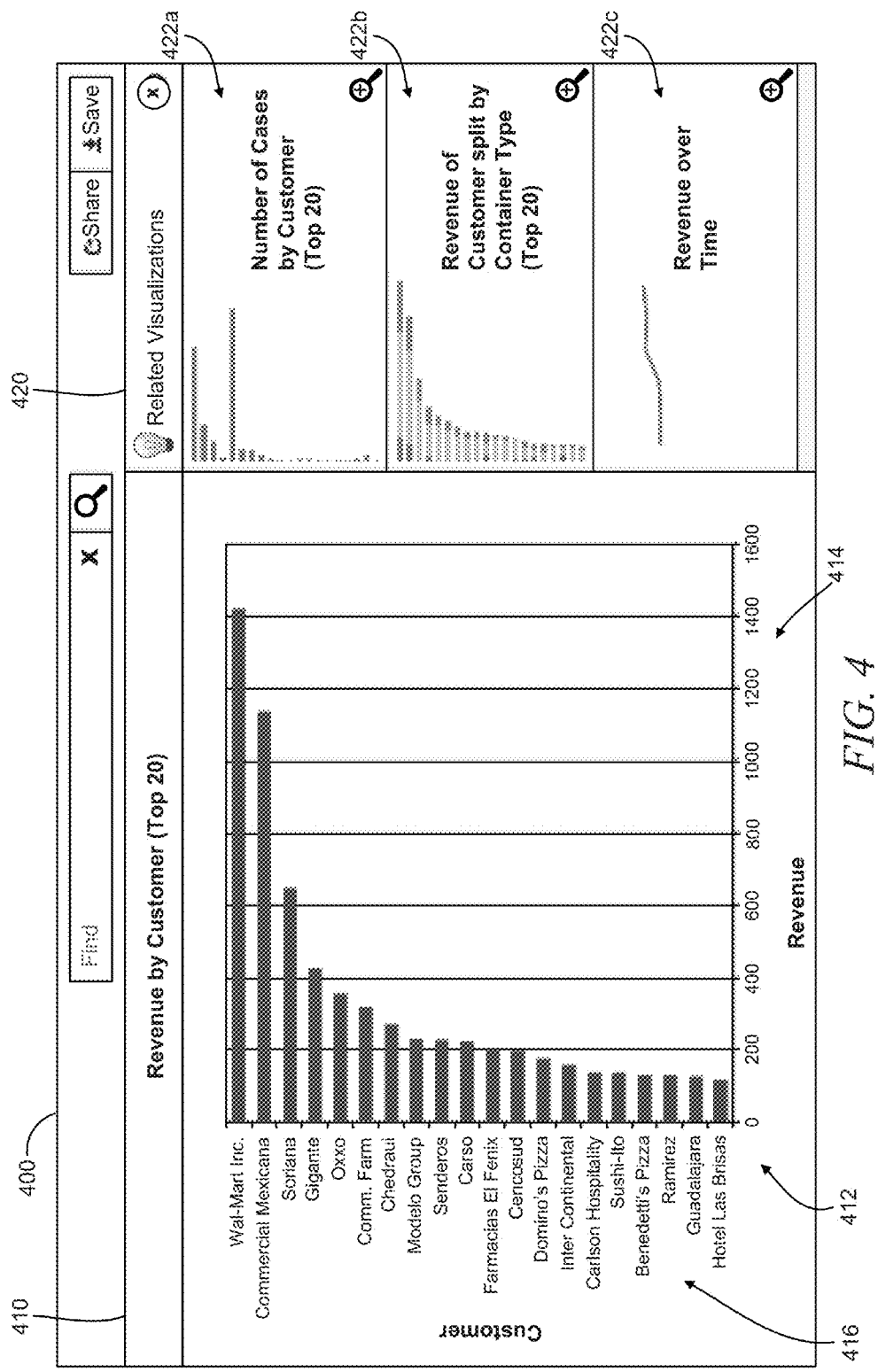
FIG. 4 illustrates a user interface displaying a current visualization and visualization suggestions, in accordance with some example embodiments.

FIG. 4 illustrates a user interface 400 displaying a current visualization 412 and visualization suggestions 422a-422c, in accordance with some example embodiments. The current visualization 412 can be displayed in a first dedicated section 410 (e.g., a main panel) of the user interface 400 that is dedicated to current visualizations 412, and the visualization suggestions 422a-422c can be displayed in a second dedicated section 420 (e.g., a side panel) of the user interface 400 that is dedicated to visualization suggestions 422a-422c.

The current visualization 412 can be a graphical representation of at least a portion of data of a dataset. The dataset can comprise a plurality of measures and a plurality of dimensions, and the data of the current visualization 412 can comprise at least one measure 414 (e.g., Total Count of Records in FIG. 4) from the plurality of measures of the dataset and at least one dimension 416 (e.g., Customer in FIG. 4) of the plurality of dimensions of the dataset. As previously mentioned, a measure 414 can be any property on which calculations can be made (e.g., numeric values), and a dimension 416 can be a structure that categorizes or labels measures 414. The current visualization 412 can comprise a bar chart, a group bar chart, a stacked bar chart, a dual bar chart, a scatter plot, a pie chart, a time chart, a stacked time chart, a dual time chart, a key point chart, and a geographic chart. Other types of charts and visualizations are also within the scope of the present disclosure.

In the example embodiment of FIG. 4, the current visualization 412 comprises a bar chart plotting the top twenty customers in terms of revenue, and there are three visual suggestions 422a-422c being displayed within the second dedicated section 420. Each one of the plurality of visualization suggestions 422a-422c can comprise a corresponding preview (e.g., a description or an image) of the graphical representation of the corresponding visualization suggestion 422. All of the visualization suggestions 422a-422c for the current visualization 412 can be generated within the context of the same data set. The top visualization suggestion 422a represents a transition to a bar chart of the number of cases by customer. The middle visualization suggestion 422b takes the bar chart of the current visualization 412 and splits the bars by an additional dimension (e.g., container type). The bottom visualization suggestion 422c switches the chart type altogether away from the bar chart of the current visualization 412, and plots the revenue by month as opposed to customer.

In some example embodiments, the visualization suggestions 422a-422c are selectable. In this respect, a user can select one of the visualization suggestion 422a-422c, and a graphical representation corresponding to the selected visualization suggestion 422 can be displayed as the current visualization 412 in the first dedicated section 410 of the user interface 400. New visualization suggestions 422a-

422c can then be generated based on the new current visualization 412 and displayed to the user in the second dedicated section 420.

Referring back to FIG. 3, the suggestion service 330 can be configured to coordinate the retrieval and ranking of visual suggestions. In some example embodiments, a context-appropriate set of transition rules 334 can be applied to determine potentially viable suggestion candidates before running specific scoring algorithms 336 to determine which suggestion candidates are the "best" suggestions (e.g., which suggestion candidates to return for display to the user).

A transition in the context of the suggestion service 330 is a navigation from one visualization (e.g., one chart) to another visualization (e.g., another chart), or put another way, from a context to a suggestion. Not all possible transitions necessarily make sense, or at least not all possible transitions are meaningful to observers. It is in the transition rules 334 that a meaningful subset of the possible navigation paths can be defined. For example, given a simple bar chart (e.g., a bar chart that contains 1 measure and 1 dimension), the transition rules 334 can dictate that reasonable transitions can include stacked bar charts, color-grouped bar charts, dual bar charts, time series charts, or even other bar charts.

FIG. 5 illustrates a matrix 500 of transition rules, in accordance with some example embodiments. Because the cost of searching through all possible transitions for every variation of visualization suggestion (e.g., all possible charts with every permutation of dimensions and measures of the dataset) for the current visualization can be computationally expensive, the transition rules can be used to reduce the search space, and thus visualization candidates, to only those transitions that are determined to be valuable (e.g., interesting, helpful, relevant, etc.) to the user.

In the example embodiment of FIG. 5, the leftmost column comprises the current states or contexts of the current visualization, while the topmost row comprises the possible visualization candidates that can be considered for suggesting to the user. It is noted that, for the purposes of simplicity and fitting within the confines of the page, the matrix 500 in FIG. 5 shows only ten different context states and visualization candidates. It is contemplated that many other context states and visualization candidates are also within the scope of the present disclosure. Looking at a situation where the current visualization is a bar chart, the transition rule of the matrix 500 show that the visualization candidates that will be considered for suggestion fall within four different types of transitions: a transition to a group bar chart, a transition to a stacked bar chart, a transition to a dual bar chart, and a transition to a time series chart. Within each type of transition, the number of different visualization candidates that can be considered for suggestion can be based on the parameters reflected in the corresponding intersecting matrix cell. These parameters can be represented by the following abbreviations:

DO=Set of orthogonal dimensions (many-to-many);
DP=Set of parental dimensions (many-to-one);
DC=Set of children dimensions (one-to-many);
D=Set of all dimensions (DO+DP+DC);
|D|=Cardinality, number of distinct values, of a dimension;
T=Set of time dimensions (choose one or go over various options);
M=Set of uncorrelated measures; and
1=Query on top of already retrieved data.

As one example, a transition from a bar chart to a group bar chart can have visualization candidates represented by DC and DP, thereby comprising all possible group bar charts that cover each permutation of the set of children dimensions and the set of parent dimensions. It is contemplated that these transition rules are only shown as an example, and that other transition rules are within the scope of the present disclosure.

Referring back to FIG. 3, exactly which transition paths should be followed (or not followed) can be determined by taking into consideration a number of metadata properties of both contextual input 338 of the current visualization, as well as the rest of the underlying dataset from which the data of the current visualization is obtained (e.g., data from the dataset that is not already represented in the current visualization). These properties, which can be part of the dataset metadata 366 stored on a database 360 and available through a consumption service 350, can include, but are not limited to, dimension cardinality, dimension semantic type (e.g., time, geographic), measure aggregation (e.g., additive, non-additive), and a relationship between dimensions (e.g., hierarchical (1:N), orthogonal (M:N), or equivalent (1:1)).

The suggestions service 330 can use this information to determine the potential viability of transition paths in order to constrain the overall search space that needs to be considered when producing suggestions. Consider the transition from a bar chart, with one measure and one dimension (MD), to a stacked bar chart, with one measure and two dimensions (MDD), where one additional dimension is added to split the bars into segments. Instead of querying for and scoring every single MD+D combination in the dataset, many combinations can be immediately discarded by eliminating split-by dimensions that have too high a cardinality (e.g., too many segments per bar) or those that have an undesirable relationship with the bar dimension (e.g., all bars split into a single segment).

Viable candidates can be short-listed before any performance-intensive query aggregations are ever executed. Transition rules can initially be broken down into modules, each of which can understand a specific type of context (e.g., bar, stacked bar, time series) and can contain logic, as described above, configured to navigate to viable chart destinations. This system can be generalized into a dependency graph of self-contained, interrelated source and destination rules modules. However, in some example embodiments, a module per context type can be used and some amount of code duplication can be tolerated due to the fact that multiple modules can potentially navigate to the same destination chart type.

The work of finding suggestions can be extremely database intensive, so performance is an important concern. The suggestion service 330 can address this concern by performing two important jobs, query batching and caching. Regarding query batching, the suggestion service 330 can employ a query service 340 to perform query batches in retrieving data from one or more datasets 364 in the database 360 such that table scans (and therefore data transfer in the system backend) are minimized. Regarding caching, the suggestion service 330 can employ a caching logic component 332 that manages a shared cache 362 of fully formed visualization suggestions in the database 360. After the transition rules 334 have determined a list of visualization candidates that make sense for the provided context, the suggestion service 330 can retrieve information about any of these visualization candidates that is stored in the suggestion cache 362, with only the remainder of visualization candidates in the list (e.g., visualization candidates not stored in the suggestion cache 362) needing to be data populated and scored.

The suggestion service 330 can be invoked by the application component 312 in the client layer 310. In some example embodiments, the suggestion service 330 is implemented on a server remote from the client 310. This configuration can have several benefits. First, it improves security. Requests can be processed in the current user's context. However, there may be scenarios where the orchestration logic may wish to take a broader view of input data (e.g., dataset statistics or, potentially, knowledge base data) in order to influence the ranking of its suggestions (even though the final results returned to the client 310 can be limited by user rights). The system engine 320 can utilize a technical user account and freely handle privileged data that could not be safely passed to the client 310. Second, this configuration enhances delivery simplicity. Client libraries typically need to be packaged and installed along with their consuming application. A relatively thick client library potentially increases coupling between the layers. Instead, a single layer can be employed to minimize this coupling and, along with it, minimize the need to update client code when the server changes and vice versa. And third, this configuration can minimize data transfer to the client 310.

The suggestion service 330 can have an API comprising a call for a suggestion, such as suggest(context, n), which can accept a context object that describes the currently active visualization and returns an array of suggestions or explanations containing enough information to allow the client application 312 to render appropriately. The API call can also allow the client 310 to specify a maximum number of suggestions or explanations to return by passing in a value for n. The API for retrieving suggestions can rely on passing a couple of data structures back and forth. For example, when making a call for a suggestion, the client 310 can pass a context object describing the starting visualization state from which suggestions should be made. In return, an array of suggestions can be passed back containing enough information for the client 310 to render the suggested visualizations (e.g., charts) as desired.

Visualization context can be a serializable description of a chart that is used both as a starting point for suggesting other charts, as well as in the resulting suggestions themselves. The visualization context can be at a level of abstraction that is independent from any specific chart rendering technology. Rather, it can be a general visualization description containing information that is useful for processing and communicating visualization suggestions. It can be thought of as a visualization specification with additional information about the data query. In some example embodiments, the visualization context can comprise: Chart Type, Chart Geometry (e.g., ordered lists representing "axes"), Dimension IDs, and Measure IDs.

Numeric key points can be a slightly special type because they represent a single specific value. In this case, Chart Geometry can be a Measure ID, but can be accompanied by some way to describe the specific dimensional context by which the value is defined. In online analytical processing (OLAP) terms, this would be the "tuple". In addition to the structure described above, the visualization context for a key point can also include: Tuple (e.g., an ordered list of dimension members identifying a specific single value context). The tuple can be expressed as a set of filters, but it can be useful to keep the tuple definition distinct from any other filters that may be applied.

For more sophisticated chart types, the role that each dimension or measure plays in the chart can sometimes be ambiguous. If this is the case, further qualification can be employed. Additionally, chart-specific fields can be added, including, but not limited to: Color, Shape, and Size.

Other important aspects of the chart that can be used for producing suggestions include filters and sorting. The suggestions service 330 can include filters in its own queries, supplemented by additional predicates. Since the filter structure can get fairly complicated, the suggestions service 330 can use the same structure as the query model (or a structure easily mapped to that one). Examples of filters include, but are not limited to, Array of Query Model (or similar) filter objects. Examples of sorting information include, but are not limited to, Dimension/Measure ID, Sort Direction, Group Level, Top N, and N. When sorting by a measure, the suggestion service 330 can specify a different aggregation level than the level of individual data points. For example, in a stacked bar chart, the bars (e.g., the groups) can be sorted, not the segments within each bar (e.g., the data points). This can be indicated by specifying the group level 1 in the sorting information. Similarly, the suggestion service 330 can apply the Top N at a higher aggregation level than individual data points. The value of Group Level can corresponds to the list of dimensions in the Chart Geometry specification described above.

The return value from the call for visualization suggestions can be a list of visualization candidates ordered from highest to lowest score. Each visualization candidate object can comprise a score (e.g., a value between 0 and 1), a visualization context, and data from the corresponding dataset. The suggestion service 330 can return a variety of different types of data.

In some example embodiments, the suggestion service 330 can return full chart data, thereby giving a guarantee to callers that suggestion results are internally consistent and fully renderable without requiring any additional data querying steps.

In some example embodiments, the suggestion service 330 can return a potentially lower-resolution snapshot of the data appropriate only for producing a thumbnail. For example, a time series chart with many lines can be reduced to just a few lines, or scatterplots that would be overly dense in a thumbnail could have some data points removed. Limiting the data in this way has the benefit of guaranteeing that the data size never becomes too large. In returning this snapshot of the data, it can be beneficial for the suggestion service 330 to acquire and use certain information. For example, the suggestion service 330 can acquire and user information about the resolution of the client 310 in order to determine what level of low-resolution is appropriate. The suggestion service 330 can acquire chart-specific knowledge about how to appropriately reduce resolution for that particular chart type. This creates another point of contact for extensibility and increases complexity.

In some example embodiments, the suggestion service 330 can return no data at all. The visualization candidates in this case can be purely conceptual, describing enough detail to allow the client 310 to recreate the query and the chart, but requiring the caller to query the database 360 itself. This is the lightest approach in terms of data transfer, but this may be a false economy if it is assumed that the client 310 will practically always query for the data to produce thumbnails or other rendered representations.

As previously mentioned, the suggestion service 330 can employ scoring algorithms 336 to determine which visualization candidates to return for display to the user. The scoring algorithms 336 can comprise a statistical analysis performed on specific chart data in order to produce a quality score (or some other metric for evaluation) that can be compared against scores for other charts. The score can represent the quality of a particular chart instance, rather than the full data from the underlying dataset. For example, in a scenario where a bar chart with Top N applied is being scored, in some example embodiments, only the N data points actually represented in the chart are considered by the scoring analysis.

In some example embodiments, scores are not necessarily intended to be precisely comparable with one another. For example, a chart with a score of 0.8 might not be noticeably superior to a chart with a score of 0.7. Rather, scoring can have other aspects. First, scoring can be used for identification and de-emphasis of charts, or other visualization candidates, with very low scores. This can be thought of as a second layer that guarantees the interestingness of the visualization candidate by evaluating the underlying data. Second, scoring can be used for tie breaking between different visualization candidates. The final list of visualization candidates can be determined by considerations such as chart variability (e.g., the desire to see a pleasing mix of chart types), as well as other factors and inputs (e.g., usage data). All other considerations being equal, the scores can be mechanisms for preferring one visualization candidate over another.

The scoring algorithms 336 can be based on properties such as variance and correlation. In some example embodiments, the level of variance among the data of a visualization candidate can have a direct effect on the score of the visualization candidate. For example, a visualization candidate having a high level of variance among its data (e.g., a bar chart showing significantly different values among its dimensions, such that its bars are at significantly different levels) can have a higher score than a visualization candidate having a low level of variance among its data (e.g., a bar chart showing minimal variation in values among its dimensions, such that all the bars are at substantially the same level).

In some example embodiments, the level of correlation between measures of a visualization candidate can have an inverse effect on the score of the visualization candidate. For example, a visualization candidate having a high level of correlation between its measures can have a lower score than a visualization candidate having a low level of correlation between its measures.

Furthermore, the scoring algorithms 336 can be chart specific. For example, the determination of the quality of a bar chart, can be different from the determination of the quality of a stacked bar chart, which can be different from the determination of the quality of a dual bar chart. The respective scores of these different charts can then be normalized so as to be comparable between different chart types.

In some example embodiments, the scoring algorithms 336 can be generic in the sense that they do not need to understand anything about the underlying data model semantics themselves beyond what is relevant for the particular chart type being scored. For example, the input for a scoring algorithm for a bar chart can comprise a flat list of data point values. To this end, scoring algorithms 336 can have no dependencies other than the support of a good statistics package.

Considerations other than just scoring can be used in determining the set of visualization candidates to return as suggestions to the user. One such consideration is the amount of variety in the suggestions. For example, suggesting a list of only bar charts might not be interesting or helpful to the user, even if the bar charts are scored very highly. In order to keep things interesting and helpful for the user, preference or additional weight can be given to suggesting a variety of chart (or other visualization) types, even if it means giving preference to a chart with a slightly lower score. In one example embodiment, the suggestion service 330 can return exactly three of the visualization candidates as suggestions to the user, but instead of returning the three visualization candidates with the highest scores, the suggestion service 330 can attempt to ensure variety by finding and returning a minimum of two different chart types from its pool of visualization candidates.

In addition to variance and correlation, other factors can be used in the scoring of visualization candidates as well. While these other factors can be used to determine the scores for the visualization candidates, they can also be used to rank or select the visualization candidates after the scores have been determined. In some example embodiments, these factors can include, but are not limited to, usage data. Usage data can comprise information about the use of data, the use of fields of data, or the use of visualizations (e.g., charts) by a user or a group of users. The suggestion service 330 can use the usage data to give priority to visualization candidates that use commonly used or popular data, fields of data, or types of visualizations. For example, the suggestions service 330 can store, maintain, and access information indicating the level of usage (e.g., quantity, frequency) for data, fields of data, or types of visualizations. This information can be stored in the database 360. Visualization candidates can be scored, ranked, or selected using this information, with priority being given to visualization candidates having data or a field of data or being of a type that has a high level of usage relative to the other visualization candidates. In some example embodiments, the level of usage can be based on the level of usage for the user to which the current visualization is being displayed. For example, if the user has previously selected, or otherwise used, dual bar charts, then any visualization candidates that include dual bar charts can be given additional weight in the scoring or selection of visualization candidates as visualization suggestions (e.g., be given a higher score or higher likelihood of being selected).

In some example embodiments, the level of usage can be based on the level of usage for a group of users with which the user, to which the current visualization is being displayed, is associated. This association can be based on profile information of the users. Such profile information can include, but is not limited to, the user's occupation, company, organization, geographic information (e.g., country), usage patterns, age, or gender. For example, if other users having similar profile information as the user to which the current visualization is being presented typically select, or otherwise use, dual bar charts, then any visualization candidates that include dual bar charts can be given additional weight in the scoring or selection of visualization candidates as visualization suggestions (e.g., be given a higher score or higher likelihood of being selected).

In some example embodiments, users can provide explicit feedback indicating preferences for certain data, fields of data, or types of visualizations. This feedback can then be used to affect the scoring or selection of visualization candidates, giving additional weight to visualization candidates having characteristics similar to those preferred by the user to which the current visualization is being displayed.

Performance of the suggestion service 330 can be a challenge, both in terms of response time and in terms of system load. Searching for suggestions can require "trying out" a number of different visualization options and then choosing the best few to return. In order to generate scores, data for the visualization candidates can be aggregated and retrieved. In one example embodiment, even though only the top twenty or so bars may actually be used in a bar chart, the database 360 can still process and sort full columns of data in order to determine which bars are the at the top. Depending on the number of visualization candidates that need to be considered, this process has the potential become significantly performance and resource intensive. There are a number of possible strategies that can be employed to help mitigate this risk.

In some example embodiments, the suggestion service 330 can limit the possible search space for visualization candidates, as previously discussed, in order to minimize load. Given every possible combination of dimensions and measures there are, of course, many will not be appropriate to suggest. Many of these combinations can be determined from metadata before any data aggregation or scoring is ever required. The transition rules can utilize dataset metadata that includes rich information about cardinalities, relationships between dimensions (e.g., 1:N vs. M:N), and measure correlation in order to efficiently eliminate known bad charts before they are considered further (e.g., before they ever turn into backend queries).

The suggestions service 330 can also further constrain the search space by excluding very high or very low cardinality fields in certain cases. For example, the suggestion service 330 can avoid creating a stacked bar chart with hundreds of segments in each bar, as such a chart would be visually unappealing and possibly confusing to the user.

In some example embodiments, cache items in the suggestion service 330 can be the scored visualization candidates themselves, in exactly the same form that is returned to client 310. The cache table can be very simple, containing only a column for the key, a column for a timestamp and a column for the serialized visualization candidate itself. The key can be split into multiple columns to allow for granular cache flushing (for example, flush the cache only for a particular user role or only for a particular dataset). As is always the case with caching, lifecycle management may need attention. The cache can have an upper limit placed on its size (e.g., there must be a fast way to check the current size) and also can have a way to request evictions if an underlying dataset changes.

The suggestion service 330 can support the most commonly useful visualization (e.g., chart) types. However, it can also be extensible to allow for the support of any visualization type. In some example embodiments, extended transition rules can support new charts being used both as an input context and as an output suggestion. Additionally, each visualization type can have its own scoring algorithm, or, in scoring algorithms, can be shared between chart types if the chart geometry and semantics are very similar.

Figure 6:
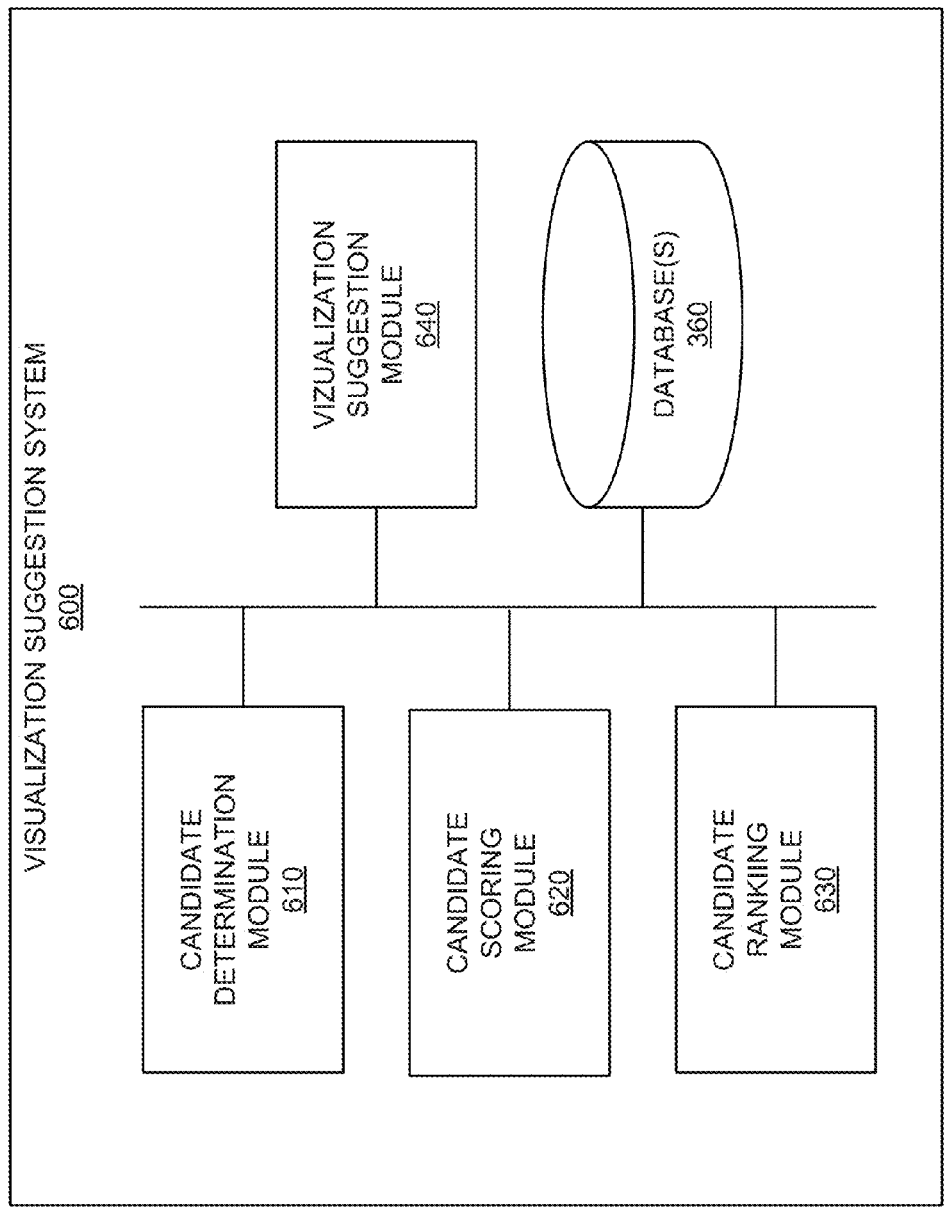
FIG. 6 is a block diagram illustrating components of a visualization suggestion system 600, in accordance with some example embodiments.

FIG. 6 is a block diagram illustrating components of a visualization suggestion system 600, in accordance with some example embodiments. The visualization suggestion system 600 can comprise the components and functionality of the suggestion service 330 in FIG. 3. In some example embodiments, the visualization suggestion system 600 can comprise any combination of one or more of a candidate determination module 610, a candidate scoring module 620, a candidate ranking module 630, a visualization suggestion module 640, and one or more databases 360. The modules 610, 620, 630, and 640 can reside on a machine having a memory and at least one processor (not shown). In some example embodiments, these modules 610, 620, 630, and 640 can be incorporated into the enterprise application platform 112 in FIG. 1 (e.g., on application server(s) 126). However, it is contemplated that other configurations are also within the scope of the present disclosure.

The candidate determination module 610 can be configured to determine a current visualization of at least a portion of data of a dataset being displayed to a user in a graphical user interface of a device. The dataset can comprise a plurality of measures and a plurality of dimensions. The current visualization can comprise a graphical representation of the at least a portion of data. The at least a portion of data can comprise at least one of the plurality of measures and at least one of the plurality of dimensions. The candidate determination module 610 can generate a plurality of visualization candidates based on an application of transition rules to the current visualization, as previously discussed. Each one of the plurality of visualization candidates can comprise a different graphical representation of data of the dataset. The plurality of measures can comprise numeric values, and the current visualization can comprise a chart. However, other configurations are also within the scope of the present disclosure. In some example embodiments, the candidate determination module 610 can be configured to determine at least one filter selected by the user to generate the current visualization, and to apply the determined filter(s) in generating the plurality of visualization candidates.

The candidate scoring module 620 can be configured to generate a corresponding score for each one of the plurality of visualization candidates based on a corresponding level of data variance for the data of the corresponding visualization candidate, as previously discussed. In some example embodiments, the candidate scoring module 620 can be configured to generate the scores for the plurality of visualization candidates, additionally or alternatively, based on at least one of: a corresponding level of cardinality for the data of the corresponding visualization candidate, usage data of a measure of the corresponding visualization candidate, usage data of a dimension of the corresponding visualization candidate, usage data of a chart type of the corresponding visualization candidate, profile information of the user, and explicit user feedback for a measure, dimension, or chart type of the corresponding visualization candidate.

The candidate ranking module 630 can be configured to generate a ranking of the plurality of visualization candidates based on the scores. The ranking can be in descending order of scores or in ascending order of scores.

The visualization suggestion module 640 can be configured to select at least one of the plurality of visualization candidates based on the ranking, and to cause a plurality of selectable visualization suggestions corresponding to the selected visualization candidates to be displayed to the user in the graphical user interface of the device. In some example embodiments, visualization suggestion module 640 can cause the plurality of selectable visualization suggestions to be displayed concurrently with the current visualization. The current visualization can be caused to be displayed in a first dedicated section of the user interface for current visualizations, and the plurality of selectable visualization suggestions can be caused to be displayed in a second dedicated section of the user interface for visualization suggestions. In some example embodiments, the visualization suggestion module 640 can be configured to detect a user selection of one of the plurality of selectable visualization suggestions, and to cause the graphical representation corresponding to the selected one of the selectable visualization suggestions to be displayed in the first dedicated section of the user interface for current visualizations. In some example embodiments, each one of the plurality of visualization suggestions can comprise a corresponding preview of the corresponding graphical representation. The selection of the visualization candidates by the visualization suggestion module 640 can be further based on the selected visualization candidates having varying chart types. It is contemplated that the visualization suggestion system 600 can incorporate any of the other features disclosed herein.

Figure 7:
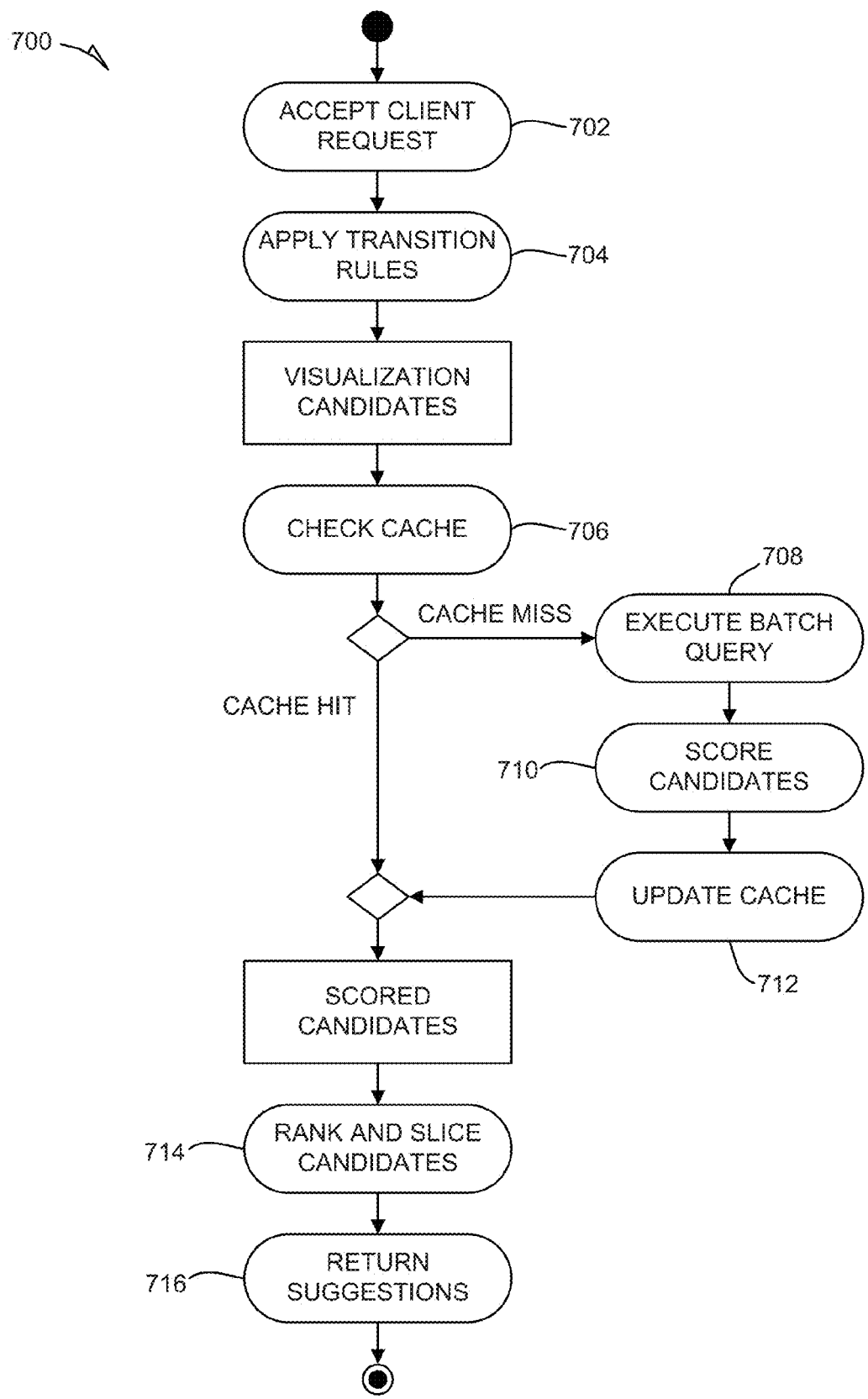
FIG. 7 is an activity diagram illustrating an activity flow of a suggestion service, in accordance with some example embodiments.

FIG. 7 is an activity diagram illustrating an activity flow 700 of a suggestion service, in accordance with some example embodiments. The operations of the activity flow 700 can be performed by processing logic that can comprise hardware (e.g., circuitry, dedicated logic, programmable logic, microcode, etc.), software (e.g., instructions run on a processing device), or a combination thereof. In one example embodiment, the activity flow 700 is performed by the suggestion service 330 of FIG. 3 or the visualization suggestion system 600 of FIG. 6, or any combination of one or more of their respective components or modules, as described above.

At point 702, a request can be accepted from a client, as previously discussed with respect to FIG. 3. The client request can comprise information describing or otherwise indicating details about a current visualization being displayed to a user on the client. At point 704, transition rules can be applied to the current visualization in order to generate visualization candidates, as previously discussed. A search space of options for generating visualization candidates can be iterated through according to the transition rules. At point 706, a cache can be checked to determine whether there are available scores for the visualization candidates, as previously discussed. If it is determined that there are available scores in the cache, then the corresponding scores are returned, and then the visualization candidates are ranked and sliced based on their corresponding scores at operation 714, as previously discussed. The selected visualization candidates can then be returned as suggestions to the client at operation 716, as previously discussed.

Referring back to the checking of the cache at operation 706, if it is determined that there are not available scores in the cache, then, at operation 708, a batch query can be executed to obtain data to be used in scoring the visualization candidates, as previously discussed. At operation 710, the visualization candidates can then be scored, as previously discussed. At operation 712, the cache can then be updated with the scores for the visualization candidates. The scores can then be used to rank and slice the visualization candidates at operation 714, as previously discussed. It is contemplated that any of the other features described within the present disclosure can be incorporated into the activity flow 700.

Figure 8:
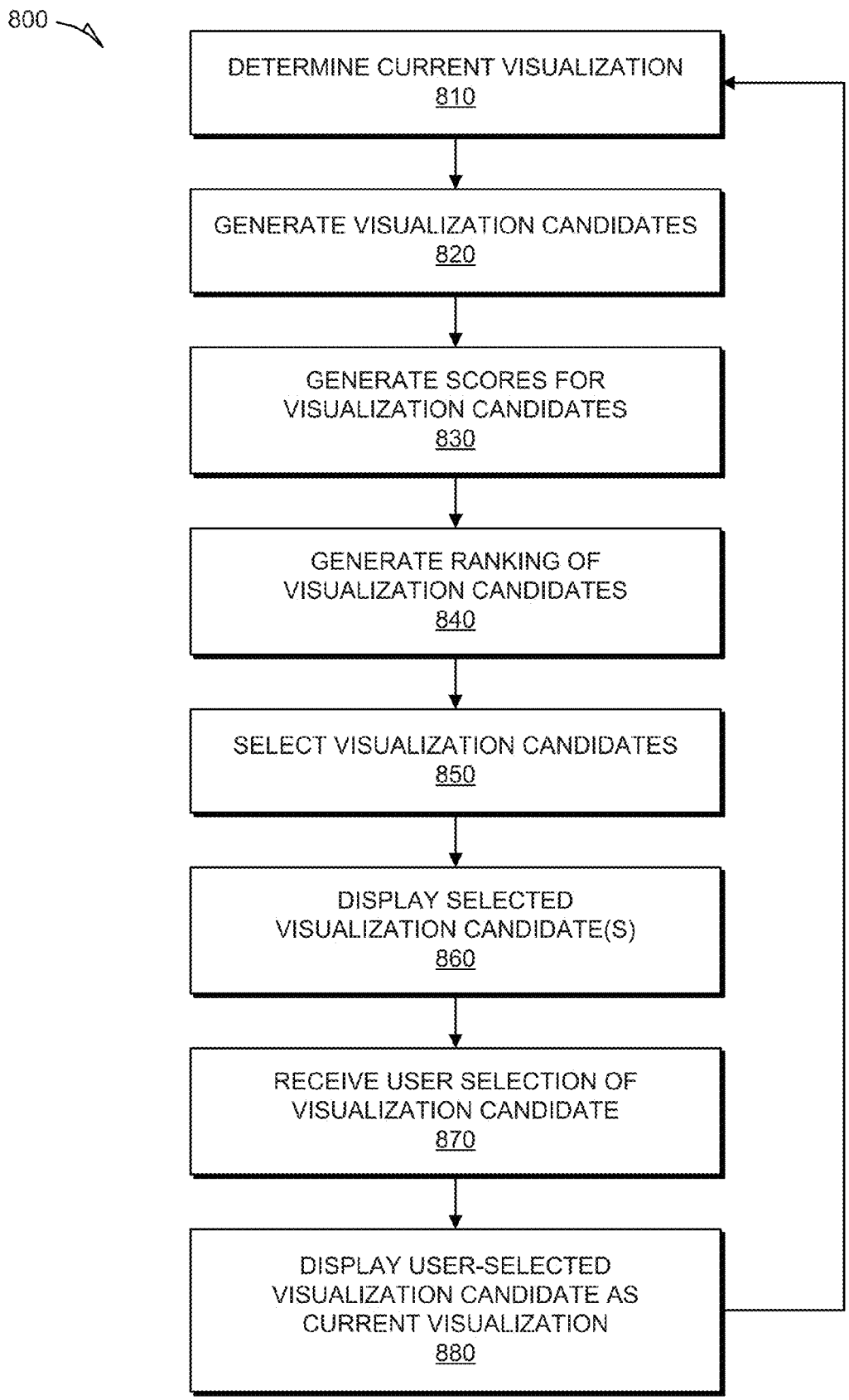
FIG. 8 is a flowchart illustrating a method of providing visualization suggestions, in accordance with some example embodiments.

FIG. 8 is a flowchart illustrating a method 800 of providing visualization suggestions, in accordance with some example embodiments. Method 800 can be performed by processing logic that can comprise hardware (e.g., circuitry, dedicated logic, programmable logic, microcode, etc.), software (e.g., instructions run on a processing device), or a combination thereof. In one example embodiment, the method 800 is performed by the suggestion service 330 of FIG. 3 or the visualization suggestion system 600 of FIG. 6, or any combination of one or more of their respective components or modules, as described above.

At operation 810, a current visualization of at least a portion of data of a dataset to be displayed to a user in a graphical user interface of a device can be determined. The dataset can comprise a plurality of measures and a plurality of dimensions. The current visualization can comprise a graphical representation of the at least a portion of data. The at least a portion of data can comprise at least one of the plurality of measures and at least one of the plurality of dimensions. At operation 820, a plurality of visualization candidates can be generated based on an application of transition rules to the current visualization. Each one of the plurality of visualization candidates can comprise a different graphical representation of data of the dataset. At operation 830, a corresponding score for each one of the plurality of visualization candidates can be generated based on a corresponding level of data variance for the data of the corresponding visualization candidate. At operation 840, a ranking of the plurality of visualization candidates can be generated based on the scores. At operation 850, at least one of the plurality of visualization candidates can be selected based on the ranking. In some example embodiments, the top N-ranked visualization candidates (e.g., N visualization candidates with the highest scores) can be selected, where N is a predetermined number. At operation 860, A plurality of selectable visualization suggestions corresponding to the selected visualization candidates can be caused to be displayed to the user in the graphical user interface of the device. At operation 870, a user selection of one of the plurality of selectable visualization suggestions can be detected. At operation 880, the graphical representation corresponding to the selected one of the selectable visualization suggestions can be caused to be displayed in the first dedicated section of the user interface for current visualizations. It is contemplated that any of the other features described within the present disclosure can be incorporated into method 800.

Example Mobile Device

Figure 9:
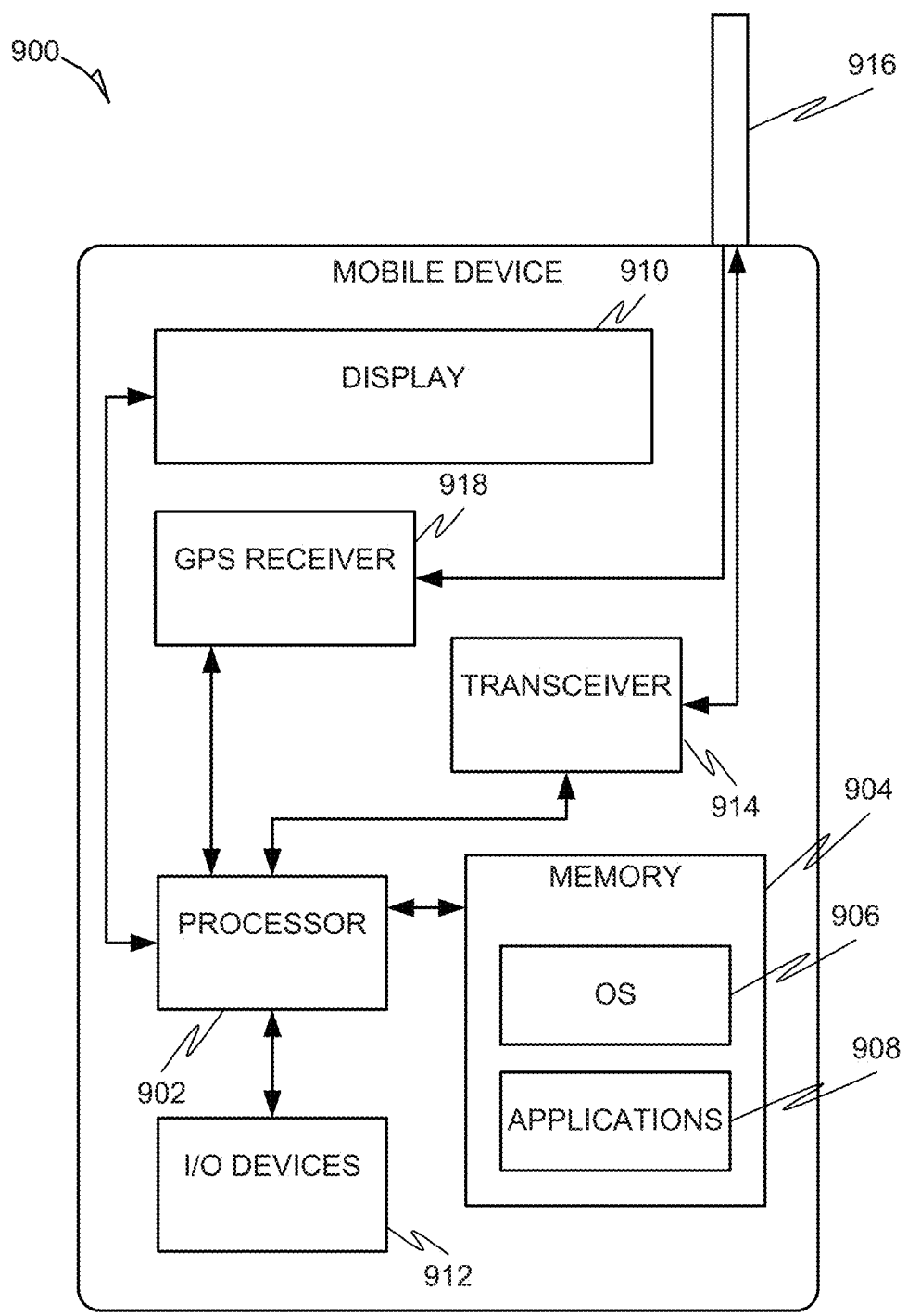
FIG. 9 is a block diagram illustrating a mobile device, in accordance with some example embodiments.

FIG. 9 is a block diagram illustrating a mobile device 900, according to some example embodiments. The mobile device 900 can include a processor 902. The processor 902 can be any of a variety of different types of commercially available processors suitable for mobile devices 900 (for example, an XScale architecture microprocessor, a Microprocessor without Interlocked Pipeline Stages (MIPS) architecture processor, or another type of processor). A memory 904, such as a random access memory (RAM), a Flash memory, or other type of memory, is typically accessible to the processor 902. The memory 904 can be adapted to store an operating system (OS) 906, as well as application programs 908, such as a mobile location enabled application that can provide LBSs to a user. The processor 902 can be coupled, either directly or via appropriate intermediary hardware, to a display 910 and to one or more input/output (I/O) devices 912, such as a keypad, a touch panel sensor, a microphone, and the like. Similarly, in some example embodiments, the processor 902 can be coupled to a transceiver 914 that interfaces with an antenna 916. The transceiver 914 can be configured to both transmit and receive cellular network signals, wireless data signals, or other types of signals via the antenna 916, depending on the nature of the mobile device 900. Further, in some configurations, a GPS receiver 918 can also make use of the antenna 916 to receive GPS signals.

Modules, Components and Logic

Certain embodiments are described herein as including logic or a number of components, modules, or mechanisms. Modules can constitute either software modules (e.g., code embodied on a machine-readable medium or in a transmission signal) or hardware modules. A hardware module is a tangible unit capable of performing certain operations and can be configured or arranged in a certain manner. In example embodiments, one or more computer systems (e.g., a standalone, client, or server computer system) or one or more hardware modules of a computer system (e.g., a processor or a group of processors) can be configured by software (e.g., an application or application portion) as a hardware module that operates to perform certain operations as described herein.

In various embodiments, a hardware module can be implemented mechanically or electronically. For example, a hardware module can comprise dedicated circuitry or logic that is permanently configured (e.g., as a special-purpose processor, such as a field programmable gate array (FPGA) or an application-specific integrated circuit (ASIC)) to perform certain operations. A hardware module can also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) can be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor can be configured as respective different hardware modules at different times. Software can accordingly configure a processor, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple of such hardware modules exist contemporaneously, communications can be achieved through signal transmission (e.g., over appropriate circuits and buses) that connect the hardware modules. In embodiments in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the network 114 of FIG. 1) and via one or more appropriate interfaces (e.g., APIs).

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 10:
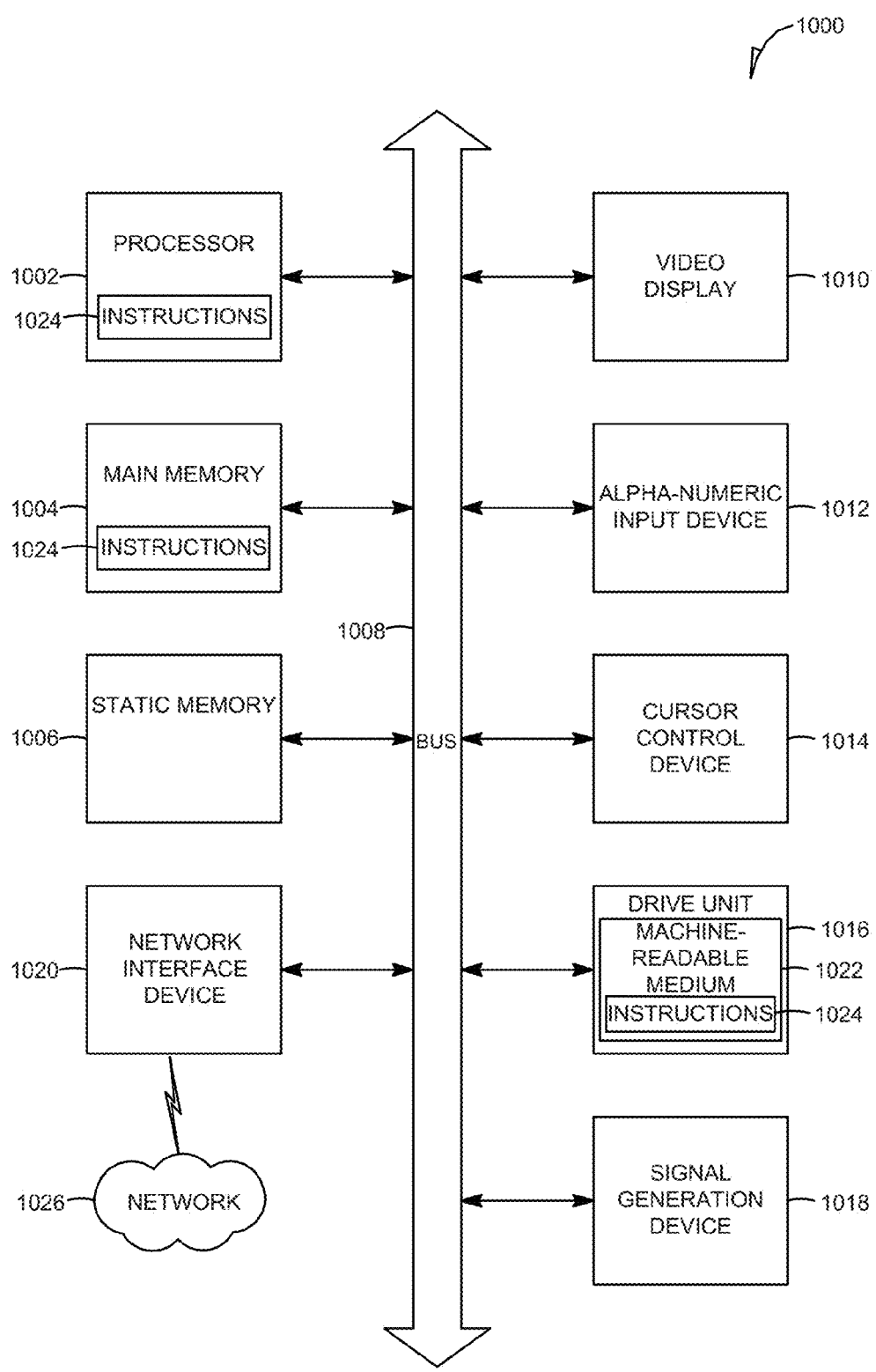
FIG. 10 is a block diagram of an example computer system on which methodologies described herein can be executed, in accordance with some example embodiments.

FIG. 10 is a block diagram of a machine in the example form of a computer system 1000 within which instructions 1024 for causing the machine to perform any one or more of the methodologies discussed herein can be executed, in accordance with some example embodiments. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 can further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of data structures and instructions 1024 (e.g., software) embodying or utilized by any one or more of the methodologies or functions described herein. The instructions 1024 can also reside, completely or at least partially, within the main memory 1004 and/or within the processor 1002 during execution thereof by the computer system 1000, the main memory 1004 and the processor 1002 also constituting machine-readable media. The instructions 1024 can also reside, completely or at least partially, within the static memory 1006.

While the machine-readable medium 1022 is shown in an example embodiment to be a single medium, the term "machine-readable medium" can include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1024 can further be transmitted or received over a communications network 1026 using a transmission medium. The instructions 1024 can be transmitted using the network interface device 1020 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   at least one processor; and
   a non-transitory computer-readable medium storing executable instructions that, when executed, cause the at least one processor to perform operations comprising:
   determining a current visualization of at least a portion of data of a dataset to be displayed to a user in a graphical user interface of a device, the dataset comprising a plurality of measures and a plurality of dimensions, the current visualization comprising a graphical representation of the at least a portion of data, the at least a portion of data comprising at least one of the plurality of measures and at least one of the plurality of dimensions; and
   generating a plurality of visualization candidates based on an application of transition rules to the current visualization, each one of the plurality of visualization candidates comprising a different graphical representation of data of the dataset, the generating of the plurality of visualization candidates comprising omitting at least one possible visualization candidate from the plurality of visualization candidates based on the transition rules, the generating the plurality of visualization candidates comprising searching through a search space of transitions from the current visualization to other visualizations, the application of the transition rules reducing the search space that is searched in the generating, the plurality of visualization candidates;

generating a corresponding score for each one of the plurality of visualization candidates based on a corresponding level of data variance for the data of the one of the plurality of visualization candidates, the corresponding level of data variance for the data having a direct effect on the corresponding score for the each one of the plurality of visualization candidates such that an increase in the corresponding level of data variance for the data results in an increase in the corresponding score and a decrease in the corresponding level of data variance for the data results in a decrease in the corresponding score, the generated corresponding score for each one of the plurality of visualization candidates being further based on at least one of usage data of a measure of the each one of the plurality visualization candidates, usage data of a dimension of the each one of the plurality of visualization candidates, usage data of a chart type of the each one of the plurality of visualization candidates, profile information of the user, and explicit user feedback for a measure, dimension, or chart type of the corresponding visualization candidate, generating a ranking of the plurality of visualization candidates based on the corresponding scores of the plurality of visualization candidates;

selecting at least one of the plurality of visualization candidates based on the ranking; and causing a plurality of selectable visualization suggestions corresponding to the selected visualization candidates to be displayed to the user in the graphical user interface of the device.

2. The system of claim 1, wherein the operations further comprise causing the plurality of selectable visualization suggestions to be displayed concurrently with the current visualization, the current visualization being caused to be displayed in a first dedicated section of the graphical user interface for current visualizations, the plurality of selectable visualization suggestions being caused to be displayed in a second dedicated section of the graphical user interface for visualization suggestions.

3. The system of claim 2, wherein the operations further comprise:
detecting a user selection of one of the plurality of selectable visualization suggestions; and
causing the graphical representation corresponding to the selected one of the selectable visualization suggestions to be displayed in the first dedicated section of the graphical user interface for current visualizations.

4. The system of claim 1, wherein each one of the plurality of visualization suggestions comprises a corresponding preview of the corresponding graphical representation.

5. The system of claim 1, wherein the plurality of measures comprises numeric values.

6. The system of claim 1, wherein the current visualization comprises a chart.

7. The system of claim 1, wherein the operations further comprise:

determining at least one filter selected by the user to generate the current visualization; and
applying the at least one filter in generating the plurality of visualization candidates.

8. The system of claim 1, wherein the selecting of the at least one of the plurality of visualization candidates is further based on the selected visualization candidates having varying chart types.

9. A computer-implemented method comprising:
determining, by at least one processor, a current visualization of at least a portion of data of a dataset to be displayed to a user in a graphical user interface of a device, the dataset comprising a plurality of measures and a plurality of dimensions, the current visualization comprising a graphical representation of the at least a portion of data, the at least a portion of data comprising at least one of the plurality of measures and at least one of the plurality of dimensions;

generating, by the at least one processor, a plurality of visualization candidates based on an application of transition rules to the current visualization, each one of the plurality of visualization candidates comprising a different graphical representation of data of the dataset, the generating of the plurality of visualization candidates comprising omitting at least one possible visualization candidate from the plurality of visualization candidates based on the transition rules, the generating the plurality of visualization candidates comprising searching through a search space of transitions from the current visualization to other visualizations, the application of the transition rules reducing the search space that is searched in the generating the plurality of visualization candidates;

generating, by the at least one processor, a corresponding score for each one of the plurality of visualization candidates based on a corresponding level of data variance for the data of the one of the plurality of visualization candidates, the corresponding level of data variance for the data having a direct effect on the corresponding score for the each one of the plurality of visualization candidates such that an increase in the corresponding level of data variance for the data results in an increase in the corresponding score and a decrease in the corresponding level of data variance for the data results in a decrease in the corresponding score, the generated corresponding score for each one of the plurality of visualization candidates being further based on at least one of: usage data of a measure of the each one of the plurality of visualization candidates, usage data of a dimension of the each one of the plurality of visualization candidates, usage data of a chart type of the each one of the plurality of visualization candidates, profile information of the user, and explicit user feedback for a measure, dimension, or chart type of the corresponding visualization candidate;

generating, by the at least one processor, a ranking of the plurality of visualization candidates based on the corresponding scores of the plurality of visualization candidates;

selecting, by the at least one processor, at least one of the plurality of visualization candidates based on the ranking; and causing, by the at least one processor, a plurality of selectable visualization suggestions corresponding to the selected visualization candidates to be displayed to the user in the graphical user interface of the device.

10. The method of claim 9, wherein the method further comprises causing the plurality of selectable visualization suggestions to be displayed concurrently with the current visualization, the current visualization being caused to be displayed in a first dedicated section of the graphical user interface for current visualizations, the plurality of selectable visualization suggestions being caused to be displayed in a second dedicated section of the graphical user interface for visualization suggestions.

11. The method of claim 10, wherein the method further comprises:
detecting a user selection of one of the plurality of selectable visualization suggestions; and
causing the graphical representation corresponding to the selected one of the selectable visualization suggestions to be displayed in the first dedicated section of the graphical user interface for current visualizations.

12. The method of claim 9, wherein each one of the plurality of visualization suggestions comprises a corresponding preview of the corresponding graphical representation.

13. The method of claim 9, wherein the plurality of measures comprises numeric values.

14. The method of claim 9, wherein the current visualization comprises a chart.

15. The method of claim 9, wherein the method further comprises:
determining at least one filter selected by the user to generate the current visualization; and
applying the at least one filter in generating the plurality of visualization candidates.

16. The method of claim 9, wherein the selecting of the at least one of the plurality of visualization candidates is further based on the selected visualization candidates having varying chart types.

17. A non-transitory machine-readable storage medium, tangibly embodying a set of instructions that, when executed by at least one processor, causes the at least one processor to perform a set of operations comprising:
determining a current visualization of at least a portion of data of a dataset to be displayed to a user in a graphical user interface of a device, the dataset comprising a plurality of measures and a plurality of dimensions, the current visualization comprising a graphical representation of the at least a portion of data, the at least a portion of data comprising at least one of the plurality of measures and at least one of the plurality of dimensions;
generating a plurality of visualization candidates based on an application of transition rules to the current visualization, each one of the plurality of visualization candidates comprising a different graphical representation of data of the dataset, the generating of the plurality of visualization candidates comprising omitting at least one possible visualization candidate from the plurality of visualization candidates based on the transition rules, the generating the plurality of visualization candidates comprising searching through a search space of transitions from the current visualization to other visualizations, the application of the transition rules reducing the search space that is searched in the generating the plurality of visualization candidates;
generating a corresponding score for each one of the plurality of visualization candidates based on a corresponding level of data variance for the data of the one of the plurality of visualization candidates, the corresponding level of data variance for the data having a direct effect on the corresponding score for the each one of the plurality of visualization candidates such that an increase in the corresponding level of data variance for the data results in an increase in the corresponding score and a decrease in the corresponding level of data variance for the data results in a decrease in the corresponding score, the generated corresponding score for each one of the plurality of visualization candidates being further based on at least one of: usage data of a measure of the each one of the plurality of visualization candidates, usage data of a dimension of the each one of the plurality of visualization candidates, usage data of a chart type of the each one of the plurality of visualization candidates, profile information of the user, and explicit user feedback for a measure, dimension, or chart type of the corresponding visualization candidate;
generating a ranking of the plurality of visualization candidates based on the corresponding scores of the plurality of visualization candidates;
selecting at least one of the plurality of visualization candidates based on the ranking; and
causing a plurality of selectable visualization suggestions corresponding to the selected visualization candidates to be displayed to the user in the graphical user interface of the device.

18. The storage medium of claim 17, wherein the plurality of selectable visualization suggestions is caused to be displayed concurrently with the current visualization, the current visualization being caused to be displayed in a first dedicated section of the graphical user interface for current visualizations, the plurality of selectable visualization suggestions being caused to be displayed in a second dedicated section of the user interface for visualization suggestions, the set of operations further comprising:
detecting a user selection of one of the plurality of selectable visualization suggestions; and
causing the graphical representation corresponding to the selected one of the selectable visualization suggestions to be displayed in the first dedicated section of the graphical user interface for current visualizations.

* * * * *